Patented July 20, 1937

2,087,438

UNITED STATES PATENT OFFICE 2,087,438

DYESTUFFS OF THE ANTHRAQUINONE SERIES

Georg Kränzlein, Ernst Diefenbach and Fritz Eggert, Frankfort-on-the-Main, and Georg Rösch, Cologne, Germany, assignors to General Aniline Works, Inc., New York, N. Y., a corporation of Delaware No Drawing. Application February 27, 1936, Serial No. 66,140. In Germany March 1, 1935

6 Claims. (Cl. 260—60)

This invention relates to dyestuffs of the anthraquinone series.

We have found that new valuable dyestuffs of the anthraquinone series may be obtained by causing an alpha-halogen-anthraquinone-ortho-sulfochloride, which may contain one or several nuclear halogen atoms, to react with a primary or secondary, aliphatic or aromatic amine. The reaction is advantageously carried out in a suitable medium under such conditions that at first the corresponding sulfonamide, for instance, of an aliphatic amine is formed, without simultaneous exchange of the halogen contained in the anthraquinone nucleus. In the halogen-anthraquinone sulfonamide thus formed the nuclear halogen atoms are exchanged in a second phase by condensation with an aliphatic or aromatic, primary or secondary amine. The said reactions may be performed by causing an amine to act upon an alpha-halogen-anthraquinone-ortho-sulfochloride, in the presence of an acid binding agent and, if necessary, at elevated temperature. When the reaction is finished, the halogen-anthraquinone-sulfonamide is caused to react in a second operation with an aliphatic or aromatic, primary or secondary amine, in the presence of copper or a copper compound, and an acid binding agent.

Since it is possible to use a great variety of amines the present invention leads to numerous, hitherto unknown, dyestuffs of the anthraquinone series which, as far as necessary or desired, may be transformed into acid wool dyestuffs by a treatment with sulfonating agents. Thus, there are obtained, for instance, dyestuffs of the following formula:

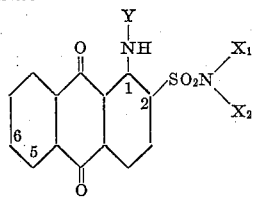

wherein $X_1$ means hydrogen or an aliphatic radical, $X_2$ means an aliphatic radical, Y means an aliphatic or aromatic radical and wherein the groups in 1- and 2-positions of the anthraquinone nucleus may further be contained in 5- and 6- positions.

The anthraquinone-sulfochlorides used in this invention may be obtained, for instance, by heating the corresponding anthraquinone-sulfonic acids with phosphorus oxy-chloride or phosphorus pentachloride at about 100° C. to about 110° C.

The following examples serve to illustrate the invention, but they are not intended to limit it thereto; the parts are by weight:

(1) A mixture of 40 parts of 1-bromanthraquinone-2-sulfochloride, 10 parts of taurine, 20 parts of calcined sodium carbonate and 600 parts of water is at first stirred for 4 hours at 60° C. to 70° C., then for 2 hours at 80° C. to 85° C., whereby dissolution occurs. On cooling the sodium salt of 1-bromanthraquinone-2-sulfotauride crystallizes in the form of yellow clustered microscopic needles which, after filtering with suction, are washed with dilute sodium chloride solution. A further quantity of the sodium salt may be obtained by adding sodium chloride to the mother liquor.

(2) 28 parts of 1-bromanthraquinone-2-sulfotauride, obtainable as described in Example 1 (in the form of its sodium salt), 8 parts of ortho-phenylene-diamine, 7 parts of calcined sodium carbonate and 0.5 part of cuprous chloride are together stirred in 200 parts of water at room temperature. The suspension which is at first formed becomes a brown solution and a brown crystalline precipitate separates. The dyestuff is isolated and purified by any known method. It dyes wool beautiful red-brown tints of good properties of fastness.

(3) 43 parts of 1-iodanthraquinone-2-sulfochloride, 28 parts of methyltaurine and 11 parts of calcined sodium carbonate are together stirred in 250 parts of water for 3 hours at 70° C. to 75° C. and the whole is then gently boiled for 1 hour until a clear solution is obtained. On cooling, the 1-iodanthraquinone-2-sulfomethyltauride crystallizes in the form of its sodium salt.

(4) 28 parts of the sodium salt obtainable as described in Example 3, 7 parts of ortho-phenylene-diamine, 8 parts of calcined sodium carbonate and 0.5 part of cuprous chloride are together stirred in 200 parts of water at 40° C. until the whole has dissolved to a deep brown solution. From the filtered solution the dyestuff may be salted out by addition of sodium chloride. It dyes wool beautiful brown tints of good properties of fastness. The dyestuff, probably, has the following constitution:

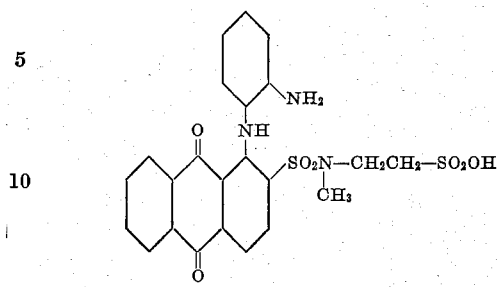

(5) A mixture of 25 parts of 1-bromanthraquinone-2-sulfomethyltauride (in the form of its sodium salt), 20 parts of meta-amino-dimethylaniline, 5 parts of calcined sodium carbonate, 250 parts of water and 0.5 part of cuprous chloride is stirred at 40° C. to 50° C. until the condensation is finished.

By working up the mixture, a green crystalline dyestuff is obtained which dissolves in water to a clear green solution and dyes wool clear yellowish-green tints.

(6) 25 parts of 1-bromanthraquinone-2-sulfomethyltauride (in the form of its sodium salt), 18 parts of 2-aminodiphenylamine-4-sulfonic acid, 8 parts of calcined sodium carbonate, and 0.5 part of cuprous chloride are together stirred in 200 parts of water at 40° C. to 50° C. until the reaction is at an end. By salting out with sodium chloride, a violet-brown condensation product is obtained.

(7) 12 parts of 1-bromanthraquinone-2-sulfochloride are boiled in 200 parts of a solution of 10 per cent. strength of diethanolamine for about 6 hours. After complete dissolution, hydrochloric acid is added, whereupon the 1-bromanthraquinone-2-sulfodiethanolamide separates on cooling, in the form of small needles. Similarly as described above, its bromine atom may be exchanged for other aliphatic or aromatic bases.

(8) According to the process of the above examples, there may be obtained by condensing 1,5-di-iodanthraquinone-2,6-disulfochloride with methyltaurine the 1,5-diiodoanthraquinone-2,6-disulfo-methyl-tauride, the iodine atoms of which may be caused to react with different aliphatic or aromatic bases in the presence of cuprous chloride.

(9) 50 parts of 1-bromanthraquinone-2-sulfotauride (in the form of its sodium salt), 23 parts of aminosalicylic acid (OH : COOH : NH$_2$=1 : 2 : 6), 20 parts of calcined sodium carbonate and 1 part of cuprous chloride are together stirred at 40° C. in 250 parts of water until the condensation is at an end. Sodium chloride is added to the red solution and it is then acidified with dilute hydrochloric acid. The dyestuff thus isolated dyes wool violet tints which become grey-brown when after-treated with agents yielding chromium.

The 1-bromanthraquinone-2-sulfochloride used in Example 1 may be prepared, for instance, as follows:

A mixture of 100 parts of 1-bromanthraquinone-2-sulfonic acid (sodium salt), 350 parts of phosphorus oxy-chloride and 85 parts of phosphorus pentachloride is heated in the oil bath for 3–4 hours at 100° C.–110° C., while stirring. After cooling, it is filtered with suction and the crystalline residue is extracted with hot water. The 1-bromanthraquinone-2-sulfochloride is thus obtained in the form of yellow-prismatic crystals, melting at 236° C.–237° C. It dissolves in hot glacial acetic acid, hot benzene, hot chlorobenzene and so on. Recrystallized from chlorobenzene it melts at 237° C.–238° C.

The 1 - bromanthraquinone - 2 - sulfochloride may also be prepared from sodium-1-bromanthraquinone-2-sulfonate by treating it with chlorosulfonic acid.

We claim:
1. The products of the general formulae:

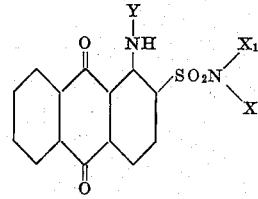

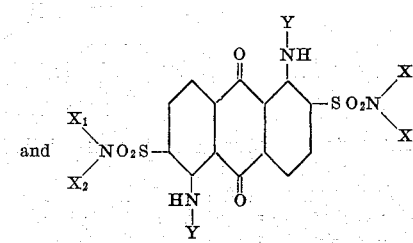

wherein X$_1$ means a member of the group consisting of hydrogen and an aliphatic radical, X$_2$ means an aliphatic radical and Y means a member of the group consisting of aliphatic and aromatic radicals.

2. The products of the general formula:

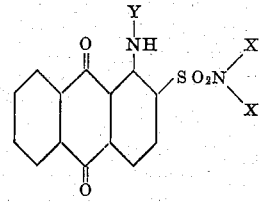

wherein X$_1$ means a member of the group consisting of hydrogen and an aliphatic radical, X$_2$ means an aliphatic radical and Y means a member of the group consisting of aliphatic and aromatic radicals.

3. The products of the general formula:

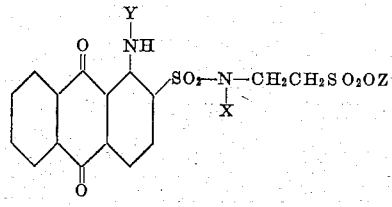

wherein X means a member of the group consisting of hydrogen and methyl, Y means an aromatic radical and Z means an alkali metal.

4. The compound of the formula:

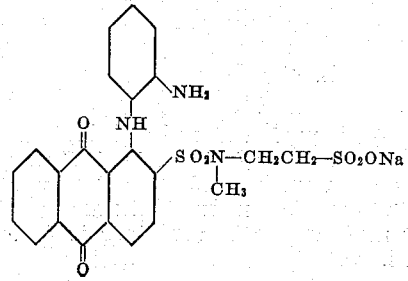

dyeing wool beautiful brown tints of good fastness properties.
5. The compound of the formula:
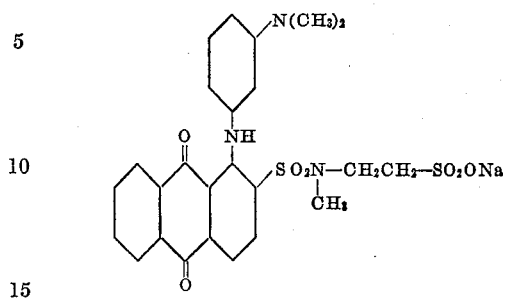
forming a green crystalline dyestuff which dissolves in water to a clear green solution and dyes wool clear yellowish-green tints.
6. The compound of the formula:
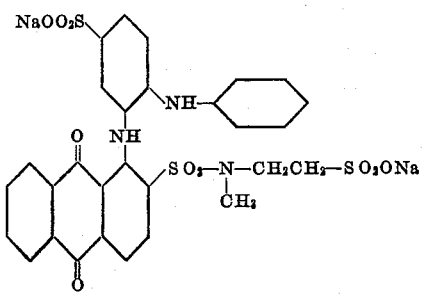
GEORG KRÄNZLEIN.
ERNST DIEFENBACH.
FRITZ EGGERT.
GEORG RÖSCH.